(12) United States Patent
Fauteux et al.

(10) Patent No.: US 11,404,887 B2
(45) Date of Patent: Aug. 2, 2022

(54) BATTERY CHARGING AND DISCHARGING USING A BATTERY BANK DURING BATTERY MANUFACTURE

(71) Applicant: Techtronic Cordless GP, Anderson, SC (US)

(72) Inventors: Denis Gaston Fauteux, Kwai Chung (HK); Aditya Subramanian, Kwai Chung (HK)

(73) Assignee: Techtronic Cordless GP, Anderson, SC (US)

( * ) Notice: Subject to any disclaimer, the term of this patent is extended or adjusted under 35 U.S.C. 154(b) by 308 days.

(21) Appl. No.: 16/792,049

(22) Filed: Feb. 14, 2020

(65) Prior Publication Data

US 2021/0257840 A1 Aug. 19, 2021

(51) Int. Cl.
| | |
|---|---|
| *H02J 7/00* | (2006.01) |
| *H01M 10/0525* | (2010.01) |
| *H01M 10/44* | (2006.01) |
| *H01M 10/06* | (2006.01) |
| *H01M 10/054* | (2010.01) |

(52) U.S. Cl.
CPC ......... *H02J 7/0013* (2013.01); *H01M 10/054* (2013.01); *H01M 10/0525* (2013.01); *H01M 10/06* (2013.01); *H01M 10/441* (2013.01); *H01M 10/446* (2013.01)

(58) Field of Classification Search
CPC .......................... H02J 7/0013; H01M 10/0525
USPC ....................................................... 320/124
See application file for complete search history.

(56) References Cited

U.S. PATENT DOCUMENTS

| | | | |
|---|---|---|---|
| 2008/0012531 A1* | 1/2008 | Chang | H02J 7/0016 320/136 |
| 2008/0036418 A1 | 2/2008 | Simoes et al. | |
| 2019/0004578 A1* | 1/2019 | Wanibuchi | H02J 7/34 |

(Continued)

FOREIGN PATENT DOCUMENTS

| | | |
|---|---|---|
| DE | 102012009394 A1 | 11/2013 |
| WO | WO-2015198008 A1 | 12/2015 |

OTHER PUBLICATIONS

Patent Cooperation Treaty, International Search Report and Written Opinion issued for PCT Application No. PCT/IB2021/050171, dated Jul. 1, 2021, 8 pages.

(Continued)

*Primary Examiner* — Suchin Parihar
(74) *Attorney, Agent, or Firm* — Norton Rose Fulbright US LLP

(57) ABSTRACT

An apparatus includes a charging circuit configured to electrically connect to a plurality of batteries during manufacture of a set of batteries that includes the plurality of batteries. The apparatus further includes a battery bank configured to supply charge to the plurality of batteries during a formation process of each battery of the plurality of batteries and to receive the charge from the plurality of batteries during the formation process. The battery bank has at least one attribute that enables the battery bank to concurrently charge, for each plurality of batteries of the set of batteries, a particular number of batteries based on at least a threshold charging rate and to concurrently discharge, for each plurality of batteries of the set of batteries, the particular number of batteries based on at least a threshold discharging rate.

20 Claims, 3 Drawing Sheets

(56) References Cited

U.S. PATENT DOCUMENTS

| | | | |
|---|---|---|---|
| 2019/0214837 A1* | 7/2019 | Kristjansson | H02J 7/04 |
| 2021/0006075 A1* | 1/2021 | Rentel | H01M 50/509 |
| 2021/0066764 A1* | 3/2021 | Ikeda | H01M 10/0567 |
| 2021/0159551 A1* | 5/2021 | Maeda | H01M 10/441 |
| 2022/0102995 A1* | 3/2022 | Fieldbinder | H02J 7/0013 |

OTHER PUBLICATIONS

"Incoming Inspection and Identification," https://www.chromaus.com/solutions_batteryformation.html, 3 pages, last accessed Dec. 2, 2019.
"Ambient Aging," https://www.chromaus.com/solutions_batteryformation.html, 2 pages, last accessed Dec. 2, 2019.
"Battery Formation," https://www.chromaus.com/solutions_batteryformation.html, 3 pages, last accessed Dec. 2, 2019.
"High Temperature Aging," https://www.chromaus.com/solutions_batteryformation.html, 2 pages, last accessed Dec. 2, 2019.
"OCV / ACR / DCR Testing," https://www.chromaus.com/solutions_batteryformation.html, 3 pages, last accessed Dec. 2, 2019.
"Automated Cell Grading and Sorting," https://www.chromaus.com/solutions_batteryformation.html, 2 pages, last accessed Dec. 2, 2019.

* cited by examiner

BATTERY CHARGING AND DISCHARGING USING A BATTERY BANK DURING BATTERY MANUFACTURE

TECHNICAL FIELD

The present invention relates generally to batteries and, more particularly, to battery charging and discharging using a battery bank during battery manufacture.

BACKGROUND OF THE INVENTION

The use of various forms of batteries has become nearly ubiquitous in today's world. As more and more portable or cordless devices, such as power tools (e.g., drills, saws, grass trimmers, blowers, sanders, etc.), small appliances (e.g., mixers, blenders, coffee grinders, etc.), communications devices (e.g., smartphones, personal digital assistants, etc.), and office equipment (e.g., computers, tablets, printers, etc.), are in widespread use, the use of battery technologies of varying chemistry and configuration is commonplace.

Battery manufacture typically includes multiple processes, such as a physical assembly process, a formation process, and other processes. A formation process may include repeatedly charging and discharging battery cells to create or activate a working material of the battery cells. As referred to herein, a particular formation process is performed on a plurality of batteries, a group of batteries, or a subset of batteries. For example, as referred to herein, a first formation process may be performed on a first plurality (or first group or subset) of batteries, and a second formation process may be performed on a second plurality (or second group or subset) of batteries after the first formation process.

Formation processes can involve use of a large amount of energy, resulting in a large energy footprint of a battery cell manufacturing plant. For example, a battery cell manufacturing plant may iteratively charge and discharge a group of batteries over hours or days before iteratively charging and discharging another group of batteries, etc. If iteratively charging and discharging each group of batteries uses a relatively large amount of energy, cost of battery manufacture can be high and the discharging results in wasted energy, placing unnecessary strain on a power grid supplying energy to the manufacturing facility.

BRIEF SUMMARY OF THE INVENTION

A battery cell manufacturing plant in accordance with at least some aspects of the disclosure is configured to perform formation processes using a battery bank. For example, instead of charging a group of batteries during a formation process using a mains electricity supply (e.g., a power grid) and then discharging the group of batteries using a resistive load, energy can be provided from the battery bank to the group of batteries during the charging portion of the formation process and then returned to the battery bank during the discharging portion of the formation process. After completion of the formation process, the energy stored in the battery bank can be used to charge one or more other groups of batteries during one or more other formation processes. As a result, energy is "recycled" among multiple groups of batteries, reducing energy consumption and improving the energy efficiency of the system utilized to carry out the formation process as compared to certain other manufacturing processes, such as manufacturing processes that charge batteries using a mains electricity supply and then discharge the batteries via a resistive load.

The battery bank has at least one attribute that enables energy "recycling" among multiple groups of batteries. The at least one attribute enables the battery bank to concurrently charge a particular number of batteries during each formation process based on at least a threshold charging rate and to concurrently discharge the particular number of batteries during the formation process based on at least a threshold discharging rate. Further, the at least one attribute enables the battery bank to iteratively charge and discharge multiple groups of batteries during multiple formation processes.

To illustrate, in some implementations, each group of batteries includes a relatively large number of batteries, such as hundreds of batteries, thousands of batteries, or another number of batteries. In this case, the battery bank may have a relatively large energy storage capacity, such as an energy storage capacity that is greater than or equal to a combined energy storage capacity of a group of batteries. Alternatively or in addition, an impedance of the battery bank may be set to enable the threshold charging rate, the threshold discharging rate, or both. In some implementations, an impedance of the battery bank is matched to a combined impedance of a group of batteries.

Alternatively or in addition, in some examples, a number of batteries included in the battery bank may be selected such that an energy storage capacity of the battery bank is greater than or equal to a combined energy storage capacity of a group of batteries. Alternatively or in addition, in some implementations, a particular cell type of the battery bank is selected to enable the threshold charging rate, the threshold discharging rate, or both.

As will be appreciated, energy "recycling" using the battery bank is typically associated with energy loss, such as parasitic energy loss due to thermal energy dissipation during discharging and recharging of the battery bank. To compensate for energy loss, a recharge circuit (e.g., a "top-off device) may be included in or coupled to the battery bank. The recharge circuit may be configured to recharge the battery bank to account for energy loss. To further illustrate, the recharge circuit may include a connection to a power source, such as a mains electricity supply or a power generator. In some implementations, the recharge circuit includes a timer circuit and a switch. The timer circuit may be configured to periodically couple the battery bank to the power source by activating the switch (e.g., upon a threshold number of formation processes or after a threshold time interval, as illustrative examples). After recharging the battery bank, the recharge circuit may be disconnected from the power source (e.g., by deactivating the switch).

One additional technical advantage associated with certain aspects of the disclosure is reduced reliance on electrical grids, which can be subject to outage, such as blackout events, brownout events, or both. For example, battery cell manufacturing plants may often be located in developing countries. In some developing countries, power supplied by an electrical grid can be unreliable and subject to outage (e.g., blackout events, brownout events, or both). By performing formation processes using a battery bank in accordance with aspects of the disclosure, interruption of power supplied to batteries during a formation process may be reduced or avoided. As a result, in some cases, use of the battery bank may enable avoidance of spoilage of the batteries caused by interruption of a formation process due to power interruption, increasing battery yield.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
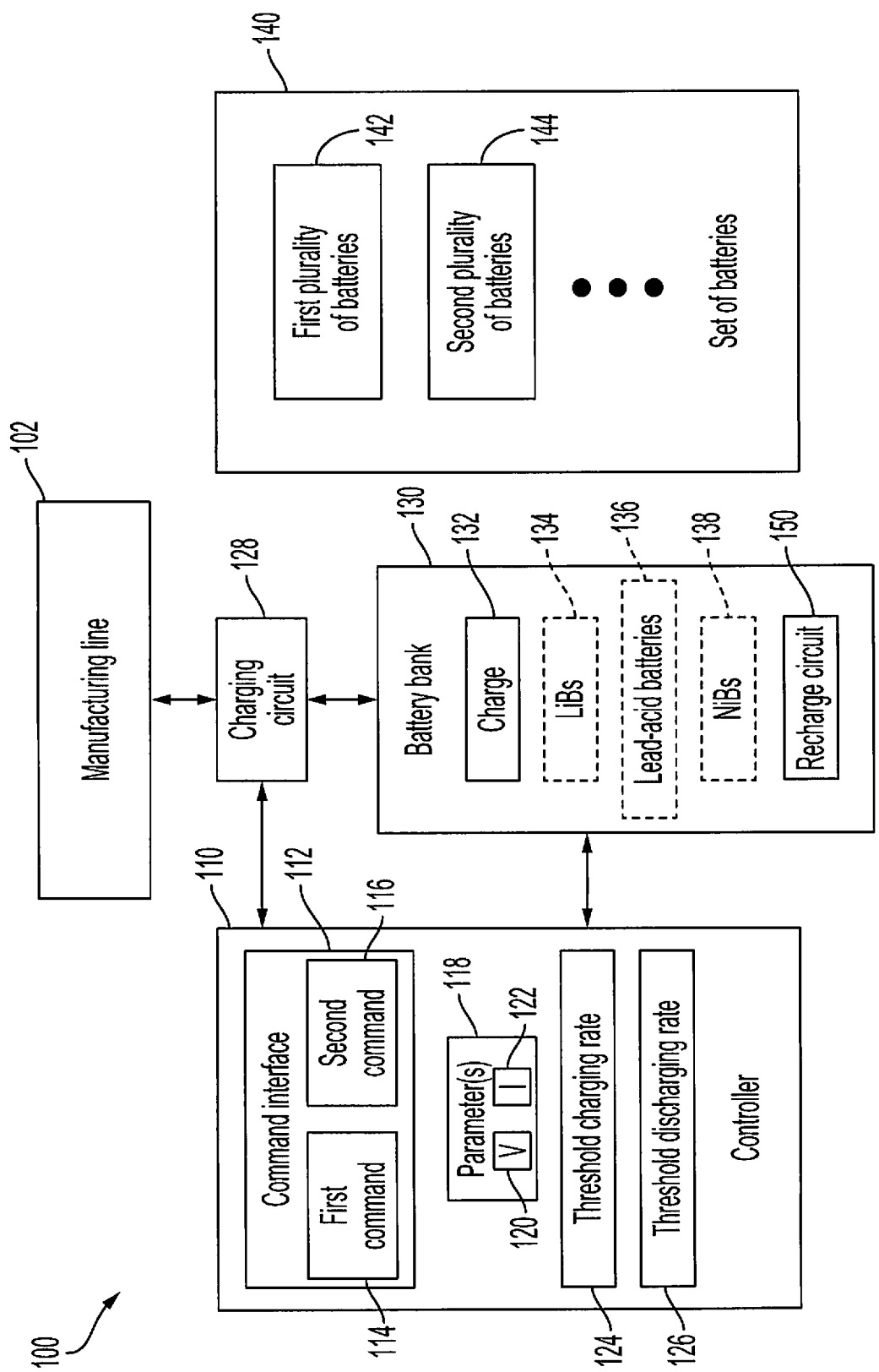
FIG. 1 shows a system that includes a formation line, a charging circuit, and a battery bank in accordance with some aspects of the disclosure.

Referring to FIG. 1, a particular illustrative example of a system is depicted and generally designated 100. In a particular example, the system 100 corresponds to or is included within a battery cell manufacturing plant.

In the example of FIG. 1, the system 100 includes a manufacturing line 102, a controller 110, a charging circuit 128, and a battery bank 130. The manufacturing line 102 is configured to perform operations during manufacture of a set of batteries 140. In some examples, the set of batteries 140 includes a particular number of batteries, such as thousands of batteries or another number of batteries. In some implementations, the manufacturing line 102 is configured to perform a manufacturing process to mass produce the set of batteries 140. The set of batteries 140 may include lithium-ion batteries (LiBs), sodium-ion batteries (NIBs), solid-state batteries, or other batteries, as non-limiting, illustrative examples.

The controller 110 is coupled to the manufacturing line 102, to the charging circuit 128, and to the battery bank 130. In some examples, the controller 110 includes a command interface 112. In a particular example, the controller 110 includes a processor and a memory that is coupled to the processor and configured to store instructions executable by the processor to initiate, perform, or control one or more operations described herein, such as one or more operations of the manufacturing line 102.

During operation of the system 100, the manufacturing line 102 performs manufacturing operations associated with the set of batteries 140. To illustrate, in some examples, the manufacturing line 102 is configured to receive a first plurality of batteries 142 of the set of batteries 140 (e.g., a first proper subset of the set of batteries 140) and to perform certain manufacturing processes on the first plurality of batteries 142. In the example of FIG. 1, the manufacturing line 102 is configured to perform a first formation process of each battery of the first plurality of batteries 142. The manufacturing line 102 includes infrastructure configured to control characteristics of cells included in batteries of the set of batteries 140.

Figure 2:
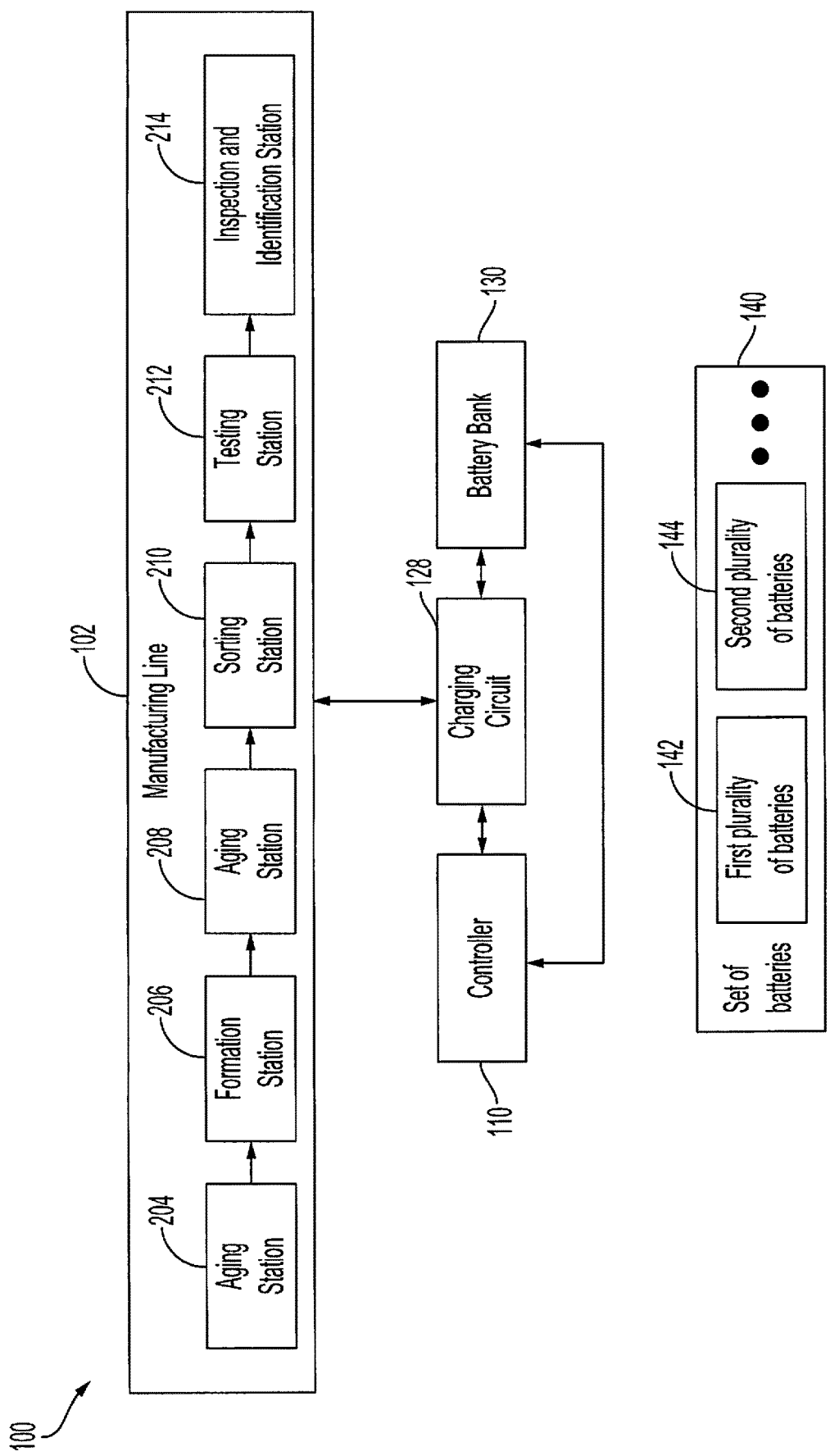
FIG. 2 shows another view of the system of FIG. 1 in accordance with some aspects of the disclosure.

For example and referring to FIG. 2, a block diagram illustrating exemplary aspects of the manufacturing line 102 of FIG. 1 according to the present disclosure are shown. In the example illustrated in FIG. 2, the manufacturing line 102 includes a formation station 206. The formation station 206 is coupled to the charging circuit 128. In some implementations, the manufacturing line 102 further includes one or more aging stations coupled to the formation station 206, such as an aging station 204 and an aging station 208. The manufacturing line 102 also includes a sorting station 210, a testing station 212, and an inspection and identification station 214. It is noted that the number, type, and ordering of stations depicted in FIG. 2 is illustrative and that other implementations may include a different number of stations, a different type of stations, a different ordering of stations, or a combination thereof.

During operation, the controller 110 initiates or controls operations of the manufacturing line 102. For example, the controller 110 may be configured to initiate or control operations of an aging process performed by the aging station 204. In some implementations, the aging station 204 is configured to perform an ambient aging process during manufacture of the set of batteries 140, and the aging station 208 is configured to perform a high-temperature aging process during manufacture of the set of batteries 140. In another implementation, the aging station 204 is configured to perform a high-temperature aging process during manufacture of the set of batteries 140, and the aging station 208 is configured to perform an ambient aging process during manufacture of the set of batteries 140. In other implementations, a different number of aging processes or a different number of aging stations can be used.

In some examples, the controller 110 may be configured to determine completion of an aging process performed by the aging station 204 and to initiate transfer of the first plurality of batteries 142 from the aging station 204 to the formation station 206. In some implementations, transfer of the first plurality of batteries 142 from one station to another station includes activating an automated conveyance system of the manufacturing line 102. The automated conveyance system may be configured transfer one or more the first plurality of batteries 142 from one station to another station, such as from the aging station 204 to the formation station 206, as a non-limiting, illustrative example. The first plurality of batteries 142 may be transported via the conveyance system in one or more containers, such as trays or other mechanisms configured retain the first plurality of batteries in a desired orientation and/or location relative to the conveyance system during transport.

The charging circuit 128 is configured to electrically connect to the first plurality of batteries 142 upon arrival of the first plurality of batteries 142 at the formation station 206. For example, in some implementations, the charging circuit 128 includes a plurality of leads configured to attach to battery terminals of the first plurality of batteries 142. The formation station 206 may include battery receptacles or other types of components configured to orient the first plurality of batteries 142 in a manner that facilitates the electrical connection, such as to orient the first plurality of batteries 142 so that the battery terminals are accessible to the plurality of leads.

The battery bank 130 is configured to supply charge 132 to the first plurality of batteries 142 while the first plurality of batteries 142 are located at the formation station 206 to facilitate a charging phase of the first formation process. For example, the battery bank 130 may be configured to transfer the charge 132 to the first plurality of batteries 142 via the charging circuit 128 (e.g., using one or more leads of the charging circuit 128 that are attached to the first plurality of batteries 142 during the first formation process). The first formation process also includes a discharge phase where the charge 132 or a portion of the charge 132 provided to the first plurality of batteries 142 during the charging phase is returned to the battery bank 130 via the charging circuit 128. For example, the battery bank 130 is configured to receive at least a portion of the charge 132 from the first plurality of batteries 142 during a discharge phase of the first formation process, where the discharge phase occurs after providing the charge 132 to the first plurality of batteries 142 (e.g., after the charge phase). For example, the battery bank 130 may be configured to receive the charge 132 from the first plurality of batteries 142 via the charging circuit 128 (e.g., using one or more leads of the charging circuit 128 that are attached to the first plurality of batteries 142 during the first formation process).

In some examples, the formation station 206 is configured to iteratively charge and discharge the first plurality of batteries 142 a particular number of charge/discharge cycles during the first formation process, for a particular time duration during the first formation process, based on one or more other criteria, or a combination thereof. In some implementations, the first formation process includes creating one or more layers on the surfaces of anodes of the first plurality of batteries 142. The one or more layers may include a solid electrolyte interphase (SEI) layer, as an illustrative example. The controller 110 may be configured to initiate creation of the one or more layers by controlling the charging or discharging of the first plurality of batteries 142, such as by charging the first plurality of batteries 142 using the battery bank 130, by discharging the first plurality of batteries 142 using the battery bank 130, or both. The controller 110 may be configured to determine a range of currents and a range of voltages provided to the first plurality of batteries 142 that create the SEI layer on the surface of anodes of the first plurality of batteries 142. In some implementations, creation of the SEI layer increases battery cell performance and stability.

In a particular example, the controller 110 is configured to initiate transfer of the first plurality of batteries 142 from the formation station 206 to the aging station 208 in response to detecting completion of the first formation process, where completion of the first formation process may occur following a single charge/discharge cycle or multiple charge/discharge cycles. After the first formation process, one or more other operations may be performed on the first plurality of batteries 142. To illustrate, in some examples, an aging process is performed on the first plurality of batteries 142 at the aging station 208 after the first formation process. In some examples, the aging station 204 is configured to perform one of an ambient aging process (e.g., a room-temperature (RT) aging process) or a high-temperature (HT) aging process, and the aging station 208 is configured to perform the other of the ambient aging process or the high-temperature aging process. In some implementations, use of one or more aging processes enables stabilization of one or more layers (e.g., the SEI layer). In some examples, the SEI layer is inspected for one or more cell deficiencies (e.g., by testing one or more of voltage characteristics, impedance characteristics, or current characteristics associated with the first plurality of batteries 142 after completion of the one or more aging processes). The use of an RT aging process or an HT aging process may be related to battery chemistry, the use of various electrolyte solvents and additives, one or more other parameters, or a combination thereof. It should be appreciated that the particular aging processes are described for illustration and that other implementations may include a different number, type, or ordering of aging processes than described with reference to the example of FIG. 2. For example, different battery chemistries or manufacturing processes may be associated with different numbers, types, or ordering of aging processes.

To further illustrate, in connection with an aging process, battery cells may be charged to a certain charge level (e.g., to 100% state-of-charge (SOC)) and can remain at a certain temperature (e.g., RT or HT) depending on the process. For example, the controller 110 may be configured to charge the first plurality of batteries 142 to the 100% SOC and to verify the 100% SOC during, after, or prior to initiating one or more aging processes. The controller 110 may be configured to monitor one or more battery cell parameters during an aging process, such as cell voltage and alternating current internal resistance (ACIR).

Upon completion of an aging process, the controller 110 may be configured to verify one or more battery cell parameters. The controller 110 may be configured to "pass" or "fail" battery cells based on verification of the one or more battery cell parameters. To illustrate, the controller 110 may be configured to verify, after completion of an aging process, that cell voltages are greater than a particular voltage threshold depending on the cell design. Alternatively or in addition, in some fabrication processes, the controller 110 is configured to verify, after completion of an aging process, that cell ACIRs are less than an ACIR threshold.

After verification, batteries that satisfy the verification operations may be cleared as "passed" and prepared for packaging and shipping. Batteries with cells failing to satisfy one or more verification operations may be rejected (e.g., discarded or recycled), flagged (e.g., as non-conforming or not "passing" the verification operations), or subjected to one or more other operations. In some examples, batteries are "graded" (e.g., based on cell performance determined during cell testing or verification) according to a grading system associated with multiple grades, such as a first grade (e.g., for the "best" performing batteries), a second grade (e.g., for batteries with typical performance characteristics), and a third grade. Batteries may be implemented in different devices based on the grading system. As an example, batteries associated with the first grade may be implemented in a first type of device, batteries associated with the second grade may be implemented in a second type of device, and batteries associated with the third grade may be discarded or recycled. In other implementations, one or more other grading systems or techniques may be used, such as by using a different number of grades (e.g., two grades, four grades, or another number of grades). In an aspect, the grading system may be used to distribute batteries to different customers, such as to provide each customer with batteries matching a particular grade specified by the customers. If the cell does not meet any customer requirements then it has to be discarded/recycled In some examples, the sorting station 210 is configured to perform sorting of the set of batteries 140. For example, the sorting station 210 may be configured to perform a first sorting process to sort batteries of the first plurality of batteries 142. Depending on the particular implementation, battery sorting can be performed prior to, during, or after aging processes performed by the aging stations 204, 208. In some examples, battery sorting includes grading and sorting batteries based on battery performance or capacity, as illustrative examples.

In the example of FIG. 2, the testing station 212 is configured to perform testing of the set of batteries 140. For example, the testing station 212 may be configured to perform a first testing process of the first plurality of batteries 142. In some examples, battery testing includes an open-circuit voltage (OCV) test of each plurality of batteries, an Alternating current Internal resistance (ACIR) test of each plurality of batteries, one or more other tests, or a combination thereof.

In some examples, the inspection and identification station 214 is configured to perform inspection of the set of batteries 140, identification of the set of batteries 140, or a combination thereof. For example, the inspection and identification station 214 may be configured to perform a first visual inspection and identification (e.g., using a camera or another device) of the first plurality of batteries 142.

In some examples, inspection and identification performed by the inspection and identification station 214 may include verifying a ship state voltage of one or more batteries of the set of batteries 140. In some examples, the inspection and identification station 214 is configured to test the ship state voltage of each battery of the set of batteries 140 (e.g., by testing each ship state voltage of a plurality of batteries in parallel). In another example, the inspection and identification station 214 is configured to verify the ship state voltage of a sample of the set of batteries 140, such as by randomly or pseudo-randomly selecting a sample of the set of batteries 140 for ship state voltage verification. In some implementations, inspection and verification include performing a battery voltage check, a battery impedance check, and a visual check. Alternatively or in addition, one or more of the battery voltage check, the battery impedance check, and the visual check may be performed during sorting performed by the sorting station 210. In some examples, the battery voltage check, the battery impedance check, and the visual check are non-intrusive and are performed without altering a particular state (e.g., the "native" state) of the battery cells.

Referring back to FIG. 1, one or more operations described with reference to the first plurality of batteries 142 and the manufacturing line 102 may be performed with respect to other batteries of the set of batteries 140, such as a second plurality of batteries 144 of the set of batteries 140 (e.g., a second proper subset of the set of batteries 140 that is distinct from the first plurality of batteries 142). To illustrate, the formation station 206 is configured to receive the second plurality of batteries 144 during the manufacture of the set of batteries 140 by the manufacturing line 102, and the charging circuit 128 is configured to electrically connect to the second plurality of batteries 144 upon placement of the second plurality of batteries 144 at the formation station 206, as described above.

The battery bank 130 is configured to supply the charge 132 to the second plurality of batteries 144 during a charge phase of a second formation process of each battery of the second plurality of batteries 144. The battery bank 130 is configured to receive at least a portion of the charge 132 from the second plurality of batteries 144 during a discharge phase of the second formation process.

In some examples, each battery of the set of batteries 140 is charged (or discharged) to a particular ship state voltage level using the battery bank 130, such as prior to completion of a formation process. To illustrate, certain shipping, storage, and handling techniques may involve a certain charge level of a battery (e.g., 80 percent charged, 50 percent charged, 20 percent charged, or another percent charged). In some examples, a charge state of a plurality of batteries is set to the particular ship state voltage level prior to completion of a formation process of the plurality of batteries by charging or discharging the battery bank 130.

In some implementations, the controller 110 is configured to control operations of the manufacturing line 102. For example, the controller 110 may be configured to control transfer of the charge 132 from the battery bank 130 to the first plurality of batteries 142, return of at least a portion of the charge 132 from the first plurality of batteries 142 to the battery bank 130, transfer of the charge 132 from the battery bank 130 to the second plurality of batteries 144, and return of at least a portion of the charge 132 from the second plurality of batteries 144 to the battery bank 130.

To further illustrate, in some implementations, the controller 110 includes or is coupled to a counter configured to store a value that tracks a running number of charge/discharge cycles performed during the first formation process. The controller 110 may be configured to detect completion of the first formation process in response to the value satisfying a threshold number of charge/discharge cycles. In another example, the value tracks a running time duration of the first formation process, and the controller 110 is configured to detect completion of the first formation process in response to the value satisfying a threshold time duration. In other implementations other techniques may be utilized by the controller 110 facilitate control of charge/discharge cycles during the formation process.

In some implementations, the command interface 112 is configured to receive one or more commands associated with operation of the manufacturing line 102. For example, the command interface 112 may receive one or more commands from a manufacturing plant computer system, from one or more sensors or other devices of the manufacturing line 102, or a combination thereof, as illustrative examples.

As a particular example, the command interface 112 may be configured to receive a first command 114, and the controller 110 may be configured to initiate transfer of the charge 132 from the battery bank 130 to the first plurality of batteries 142 in response to the first command 114. The first command 114 may be received at the command interface 112 based on feedback provided by the conveyance system of the manufacturing line 102, such as to indicate that a plurality of batteries have arrived at the formation station 206 and have been electrically coupled to the charging circuit 128 via the plurality of leads. Additionally or alternatively, the first command 114 may be received based on user input, such as from a user terminal or computer, that indicates the plurality of batteries are ready to begin the formation process. As another example, the command interface 112 may be configured to receive a second command 116, and the controller 110 may be configured to initiate return of the charge 132 from the first plurality of batteries 142 to the battery bank 130 in response to the second command 116. The second command 116 may be received based on the tracking of the charge/discharge cycles performed during the formation process, such as an output that indicates the counter described above has reached a threshold count or the tracked value described above has reached a threshold time duration. It is noted that the exemplary mechanisms for providing the first command 114 and the second command 116 described above have been provided for purposes of illustration, rather than by way of limitation and that other techniques and mechanisms may be utilized to provide the first command 114, the second command 116, or other commands to the command interface 112 and control various operations of the manufacturing line 102 and the various processes performed at the different stations of the manufacturing line 102.

In some examples, the controller 110 is configured to receive an indication of one or more parameters 118 associated with a formation process, such as the first formation process of the first plurality of batteries 142. In some examples, the one or more parameters 118 include one or more of a voltage level 120 or a current magnitude 122 associated with transfer of the charge 132. To illustrate, in some implementations, the charging circuit 128 includes a particular circuit, such as a variable resistance device (e.g., a resistor bank), and the controller 110 is configured to adjust the variable resistance device to apply the voltage level 120 and the current magnitude 122 to the first plurality of batteries 142, to the battery bank 130, or both, during the first formation process.

In some examples, the controller 110 is configured to independently control charge-discharge cycles of a single formation process. For example, the first formation process may include a first charge-discharge cycle and at least a second charge-discharge cycle after the first charge-discharge cycle, and the controller 110 may be configured to independently control the charge portion and the discharge portion of each charge-discharge cycle.

To further illustrate, in a particular example, the controller 110 is configured to charge the first plurality of batteries 142 a first amount and for a first time duration during a charge portion of the first charge-discharge cycle and to discharge the first plurality of batteries 142 a second amount and for a second time duration during a discharge portion of the first charge-discharge cycle. In a particular example, the controller 110 is configured to charge the first plurality of batteries 142 a third amount and for a third time duration during a charge portion of the second charge-discharge cycle and to discharge the first plurality of batteries 142 a fourth amount and for a fourth time duration during a discharge portion of the second charge-discharge cycle. In some implementations, the controller 110 is configured to independently determine the first amount, the second amount, the third amount, the fourth amount, the first time duration, the second time duration, the third time duration, and the fourth time duration, such as in response to a particular state of the battery bank 130 (e.g., a charge level of the battery bank 130), a particular state of the charging circuit 128 (e.g., a voltage or a current at the charging circuit 128), one or more other parameters, or a combination thereof. Thus, the controller 110 may provide charge-discharge cycles having different durations during a single formation process performed with respect to a plurality of batteries.

The battery bank 130 has at least one attribute that enables the battery bank 130 to concurrently charge, for each plurality of batteries of the set of batteries 140, a particular number of batteries based on at least a threshold charging rate 124. At least one attribute of the battery bank 130 further enables the battery bank to concurrently discharge, for each plurality of batteries of the set of batteries 140, the particular number of batteries based on at least a threshold discharging rate 126.

To illustrate, in some implementations, each plurality of batteries (e.g., the first plurality of batteries 142 and the second plurality of batteries 144) includes a relatively large number of batteries, such as hundreds of batteries, thousands of batteries, or another number of batteries. In this case, the battery bank 130 may have a relatively large energy storage capacity, such as an energy storage capacity that is greater than or equal to an energy storage capacity of each plurality of batteries of the set of batteries 140. In this example, at least one attribute of the battery bank 130 includes an energy storage capacity of the battery bank 130.

Alternatively or in addition, in some examples, at least one attribute of the battery bank 130 includes an impedance associated with the battery bank 130. To illustrate, an impedance of the battery bank 130 may be set to enable the threshold charging rate 124, the threshold discharging rate 126, or both.

Alternatively or in addition, in some examples, at least one attribute of the battery bank 130 includes a number of batteries of the battery bank 130. For example, the number of batteries included in the battery bank 130 may be selected such that an energy storage capacity of the battery bank is greater than or equal to an energy storage capacity of each plurality of batteries of the set of batteries 140.

Alternatively or in addition, in some implementations, at least one attribute of the battery bank 130 includes a cell type of the battery bank 130. In some examples, a particular cell type of the battery bank 130 is selected to enable the threshold charging rate 124, the threshold discharging rate 126, or both. To further illustrate, the battery bank 130 may include a plurality of lithium-ion batteries (LiBs) 134, a plurality of lead-acid batteries 136, or a plurality of sodium-ion batteries (NIBS) 138, a plurality of solid state batteries, a plurality of redox flow batteries, or other batteries, as non-limiting, illustrative examples. In some examples, a type of battery with the longest estimated life cycle is implemented within the battery bank 130. Alternatively or in addition, the cell type of the battery bank 130 may be selected to increase a volumetric energy density parameter (e.g., to decrease an amount of physical space occupied by the battery bank 130). Alternatively or in addition, the cell type of the battery bank 130 may be selected to decrease an energy cost parameter, such as a dollar per Watt-hour ($/Wh) parameter (e.g., to decrease cost associated with fabrication or installation of the battery bank 130).

In some implementations, at least one attribute of the battery bank 130 includes an energy capacity (e.g., the number of cells, the size of cells, or both) of the battery bank 130. The energy capacity may be determined based on a production capacity (e.g., number of cells produced) associated with the manufacturing line 102. For example, if the production capacity of the manufacturing line 102 is 0.25 gigawatt hours (GWh) per week, then the energy capacity of the battery bank 130 may be about 30% greater than the production capacity (resulting in an energy capacity of approximately 0.325 GWh per week in this example), which may accommodate for buffering and low charge in some circumstances. Cells of the battery bank 130 may be split into individual units (e.g., partitioned) for management (e.g., ease of access) and safety. The size of the battery bank 130 (or the size of each partition of the battery bank 130) may be determined based on the size of a plant that includes the system 100, based on management and safety considerations, and based on a target power distribution along the plant.

In some examples, the charging circuit 128 has one or more attributes that enable battery charging and discharging based on at least the threshold charging rate 124 and the threshold discharging rate 126. To illustrate, the charging circuit 128 may include a plurality of leads configured to connect to terminals of each plurality of batteries of the set of batteries 140, and each of the leads may have a particular thickness (e.g., wire gauge) that enables battery charging and discharging based on at least the threshold charging rate 124 and the threshold discharging rate 126.

Alternatively or in addition, in some examples, the charging circuit 128 includes an impedance matching circuit. In some implementations, the controller 110 is coupled to the impedance matching circuit and is configured to control the impedance matching circuit to perform impedance matching between each plurality of batteries at the formation station 206 and the battery bank 130. In some examples, the controller 110 is configured to perform dynamic impedance matching (e.g., where a number of batteries or type of batteries changes from one formation process to another formation process). To further illustrate, in some cases, a first number of batteries (e.g., a batch size) of the first plurality of batteries 142 may be different than a second number of batteries of the second plurality of batteries 144, a first battery type of the first plurality of batteries 142 may be different than a second battery type of the second plurality of batteries 144, or both. In this case, the controller 110 may be configured to adjust an impedance of the charging circuit 128 using the impedance matching circuit from a first impedance associated with the first formation process performed with respect to the first plurality of batteries 142 to a second impedance associated with the second formation process performed with respect to the second plurality of batteries 144.

In some implementations, the system 100 includes a recharge circuit 150 (e.g., a "top-off" device) that is included in or coupled to the battery bank 130. The recharge circuit 150 may be configured to recharge the battery bank 130 to account for energy loss, such as parasitic energy loss due to thermal energy dissipation during discharging and recharging of the battery bank 130. To further illustrate, the recharge circuit 150 may include a connection to a power source, such as a mains electricity supply or a power generator. Alternatively or in addition, the recharge circuit 150 may include a connection to another power source, such as one or more solar panels.

In some implementations, the recharge circuit 150 includes a timer circuit and a switch. The timer circuit may be configured to periodically couple the battery bank 130 to the power source by activating the switch (e.g., upon a threshold number of formation processes, after a threshold time interval, or upon the battery bank 130 reaching a threshold charge capacity, such as a charge capacity sufficient for a particular number of additional formation processes or charge-discharge cycles, as illustrative examples). After recharging the battery bank 130, the recharge circuit 150 may be disconnected from the power source (e.g., by deactivating the switch).

In some implementations, the controller 110 is configured to control one or more environmental parameters associated with the manufacturing line 102 or with one or more particular stations of the manufacturing line 102. As an example, the formation station 206 may include or correspond to an enclosure, and the controller 110 may be coupled to one or more sensors of the enclosure and to one or more control devices (e.g., actuators) of the enclosure. The controller 110 may be configured to receive sensor data from the one or more sensors and to provide one or more control signals to the one or more control devices to adjust the one or more environmental parameters (e.g., prior to a formation process, during a formation process, after a formation process, or a combination thereof). For example, the sensor data may indicate an ambient temperature of the enclosure, and the controller 110 may be configured to provide a control signal to a thermostat device to adjust the ambient temperature within the enclosure (e.g., to a target temperature or within a target temperature range). Alternatively or in addition, in another example, the sensor data indicates an ambient humidity of the enclosure, and the controller 110 is configured to provide a control signal to a humidifier/dehumidifier device to adjust the ambient humidity of the enclosure (e.g., to a target humidity or within a target humidity range).

In some examples, the battery bank 130 is integrated within a common enclosure as the formation station 206. In this case, the battery bank 130 may be subject to the same environmental parameters as the formation station 206. In another example, the battery bank 130 is external to an enclosure of the formation station 206. In some implementations, the battery bank 130 is integrated within a battery bank enclosure that is external to an enclosure of the formation station 206. In this case, the controller 110 may be configured to control one or more environmental parameters associated with battery bank 130 independently of one or more environmental parameters associated with the manufacturing line 102. For example, in some implementations, the battery bank 130 has a large battery storage capacity, and iteratively charging and discharging the battery bank 130 during one or more formation processes generates a large amount of heat. In this case, the controller 110 may adjust an ambient temperature of the battery bank enclosure independently of an ambient temperature of the enclosure of the formation station 206 (e.g., by controlling a thermostat of the battery bank enclosure in response to temperature data provided by a temperature sensor of the battery bank enclosure). Alternatively or in addition, the controller 110 may be configured to adjust ambient humidity of the battery bank enclosure.

In some cases, controlling one or more environmental parameters of the battery bank enclosure independently of one or more environmental parameters of an enclosure of the formation station 206 may improve operating life of the battery bank 130. For example, formation processes performed at the formation station 206 may involve a particular set of environmental parameters that may be unsatisfactory or non-optimal for operating life of the battery bank 130. By controlling one or more environmental parameters of the battery bank enclosure independently of one or more environmental parameters of an enclosure of the formation station 206, operating life of the battery bank 130 can be extended in some cases.

The controller 110 may be configured to monitor and control environmental conditions associated with other aspects of the manufacturing line 102, such as the aging stations 204, 208, and the like. Further, the controller 110 may be configured to control environmental conditions of different stages of the manufacturing line independently, such as providing a first temperature and humidity control for the ambient aging stage, a second temperature and humidity control for the formation stage, and a third temperature for the high-temperature aging stage, as non-limiting examples.

In some examples, a "payback period" can be determined for implementation of the battery bank 130 in a battery cell manufacturing plant. For example, in some cases, installation of the battery bank 130 incurs a relatively large capital expenditure of the battery cell manufacturing plant. The capital expenditure can be offset (or "repaid") due to reduced electricity expenditure associated with certain conventional systems, such as systems that charge batteries from an electrical grid during a formation process and then discharge the batteries using a resistive device. To further illustrate, Table 1 illustrates certain illustrative parameters associated with payback periods for an illustrative examples of a low-cost-of-electricity country, a medium-cost-of-electricity country, and a high-cost-of-electricity country:

TABLE 1

|  | Cost of energy ($/KWh) | Cost to initially charge system ($) | Additional costs per year to recharge system ($) | Cost of power per year to use grid energy for charge/discharge ($) | Payback period (years) |
| --- | --- | --- | --- | --- | --- |
| Low Cost Country | 0.08 | 4262.4 | 85.2 | 852,480 | 18.6 |
| Medium Cost Country | 0.17 | 9057.6 | 181.2 | 1,811,520 | 8.8 |
| High Cost Country | 0.33 | 17582.4 | 351.6 | 3,516,480 | 4.5 |

In the example of Table 1, cost of energy is given in dollars per kilowatt hours ($/KWh) for each country. Table 1 also illustrates, for each country, examples of the cost to initially charge the system 100 (e.g., charge the battery bank 130), additional cost per year to recharge the system 100 (e.g., using a recharge device, as described above), and cost associated with certain conventional grid-based charge/discharge techniques facilitating formation processes (each in dollars ($)). In the example of Table 1, the payback periods for these illustrative parameters are 18.6 years, 8.8 years, and 4.5 years for the low-cost-of-electricity country, the medium-cost-of-electricity country, and the high-cost-of-electricity country, respectively.

Although certain examples of FIG. 1 are described with reference to the first plurality of batteries 142 and the second plurality of batteries 144, it is noted that the manufacturing line 102 can perform operations iteratively for any number of subsets of the set of batteries 140. For example, a formation process performed at the formation station 206 can be performed iteratively for three of more subsets of the set of batteries 140.

In some examples, the controller 110 is configured to cause the manufacturing line 102 to concurrently perform multiple operations. For example, the manufacturing line 102 may be configured to perform one or more other operations concurrently with the first formation process, such as by performing an aging process on the second plurality of batteries 144 using the aging station 204 concurrently with the first formation process performed on the first plurality of batteries 142 by the formation station 206. As another example, an aging process performed on the first plurality of batteries 142 at the aging station 208 may be performed concurrently with the second formation process performed on the second plurality of batteries 144 by the formation station 206. As an additional example, in some implementations, the manufacturing line 102 is configured to perform another aging process on another plurality of batteries of the set of batteries 140 using the aging station 204 concurrently with the aging process performed on the first plurality of batteries 142 at the aging station 208 and concurrently with the second formation process performed on the second plurality of batteries 144 by the formation station 206.

One or more aspects described with reference to FIGS. 1 and 2 reduce energy consumption as compared to certain other conventional battery manufacture techniques. For example, instead of charging a group of batteries during a formation process using a mains electricity supply and then discharging the group of batteries using a resistive load, energy can be provided from the battery bank 130 to a group of batteries and then returned to the battery bank 130 during a formation process. After completion of the formation process, the energy can be used to charge one or more other groups of batteries during one or more other formation processes. As a result, energy is "recycled" among multiple groups of batteries, reducing energy consumption as compared to certain other manufacturing processes, such as manufacturing processes that charge a battery using a mains electricity supply and then discharge the battery via a resistive load.

Figure 3:
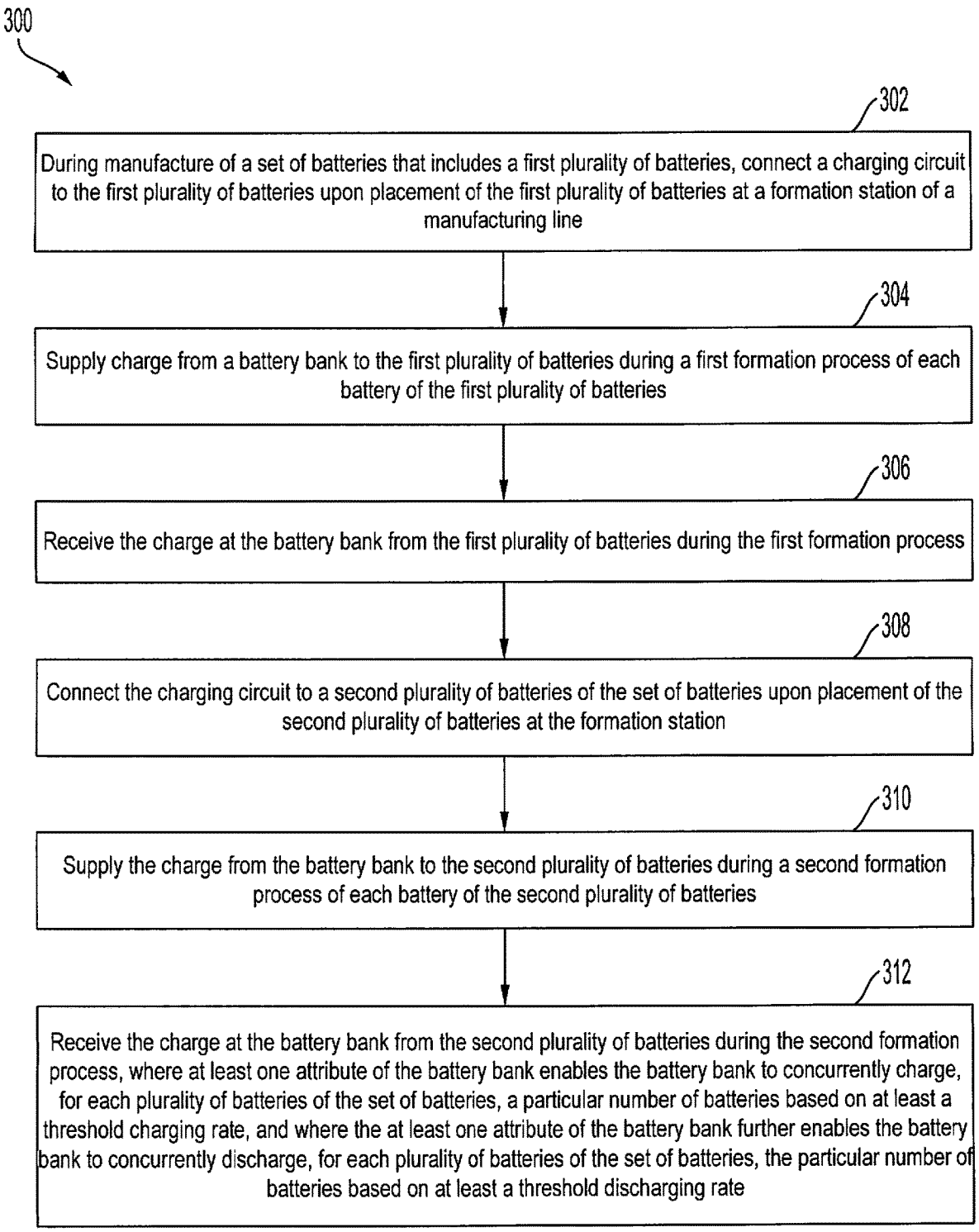
FIG. 3 shows a flow chart illustrating a method that may be performed by the system of FIG. 1 or FIG. 2 in accordance with some aspects of the disclosure.

Referring to FIG. 3, a particular illustrative example of a method is depicted and generally designated 300. In some examples, operations of the method are performed by the system 100 of FIGS. 1 and 2.

The method 300 includes connecting a charging circuit to a first plurality of batteries upon placement of the first plurality of batteries at a formation station of a manufacturing line during manufacture of a set of batteries that includes the first plurality of batteries, at 302. For example, the charging circuit 128 may be connected to the first plurality of batteries 142 at the formation station 206 of the manufacturing line 102, such as by connecting a plurality of leads of the charging circuit 128 to battery terminals of the first plurality of batteries 142.

The method 300 further includes supplying charge from a battery bank to the first plurality of batteries during a first formation process of each battery of the first plurality of batteries, at 304. For example, the charging circuit 128 is configured to supply the charge 132 from the battery bank 130 to the first plurality of batteries 142 at the formation station 206 during the first formation process.

The method 300 further includes receiving the charge from the first plurality of batteries at the battery bank during the first formation process, at 306. For example, the battery bank 130 is configured to receive the charge 132 from the first plurality of batteries 142 at the formation station 206 during the first formation process.

The method 300 further includes connecting the charging circuit to a second plurality of batteries of the set of batteries upon placement of the second plurality of batteries at the formation station, at 308. For example, the charging circuit 128 may be connected to the second plurality of batteries 144 at the formation station 206 of the manufacturing line 102, such as by connecting a plurality of leads of the charging circuit 128 to battery terminals of the second plurality of batteries 144.

The method 300 further includes supplying the charge from the battery bank to the second plurality of batteries during a second formation process of each battery of the second plurality of batteries, at 310. For example, the charging circuit 128 is configured to supply the charge 132 from the battery bank 130 to the second plurality of batteries 144 at the formation station 206 during the second formation process.

The method 300 further includes receiving the charge at the battery bank from the second plurality of batteries during the second formation process, at 312. For example, the battery bank 130 is configured to receive the charge 132 from the second plurality of batteries 144 at the formation station 206 during the second formation process.

The battery bank has at least one attribute that enables the battery bank to concurrently charge, for each plurality of batteries of the set of batteries, a particular number of batteries based on at least a threshold charging rate and to concurrently discharge, for each plurality of batteries of the set of batteries, the particular number of batteries based on at least a threshold discharging rate. For example, the at least one attribute may include one or more of an energy storage capacity of the battery bank, an impedance of the battery bank, a number of batteries of the battery bank, or a cell type of the battery bank.

In some examples, the method 300 further includes receiving, by a controller coupled to the battery bank and to the charging circuit, an indication of one or more parameters associated with the first formation process. For example, the controller 110 may receive an indication of the one or more parameters 118. In some examples, the one or more parameters indicate one or more of the voltage level 120 or the current magnitude 122 associated with transfer of the charge 132.

One or more aspects described with reference to the method 300 of FIG. 3 reduce energy consumption as compared to certain other conventional battery manufacture techniques. For example, instead of charging a group of batteries during a formation process using a mains electricity supply and then discharging the group of batteries using a resistive load, energy can be provided from the battery bank 130 to a group of batteries and then returned to the battery bank 130 during a formation process. After completion of the formation process, the energy can be used to charge one or more other groups of batteries during one or more other formation processes. As a result, energy is "recycled" among multiple groups of batteries, reducing energy consumption as compared to certain other manufacturing processes, such as manufacturing processes that charge a battery using a mains electricity supply and then discharge the battery via a resistive load.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. An apparatus comprising:
a charging circuit configured to electrically connect to a first plurality of batteries upon placement of the first plurality of batteries at a formation station of a manufacturing line during manufacture of a set of batteries that includes the first plurality of batteries; and
a battery bank coupled to the charging circuit, wherein the battery bank is configured to supply charge to the first plurality of batteries during a first formation process of each battery of the first plurality of batteries and to receive the charge from the first plurality of batteries during the first formation process,
wherein the charging circuit is further configured to electrically connect to a second plurality of batteries of the set of batteries upon placement of the second plurality of batteries at the formation station,
wherein the battery bank is further configured to supply the charge to the second plurality of batteries during a second formation process of each battery of the second plurality of batteries and to receive the charge from the second plurality of batteries during the second formation process,
wherein at least one attribute of the battery bank enables the battery bank to concurrently charge, for each plurality of batteries of the set of batteries, a particular number of batteries based on at least a threshold charging rate, and
wherein the at least one attribute of the battery bank further enables the battery bank to concurrently discharge, for each plurality of batteries of the set of batteries, the particular number of batteries based on at least a threshold discharging rate.

2. The apparatus of claim 1, wherein the at least one attribute includes one or more of an energy storage capacity of the battery bank, an impedance of the battery bank, a number of batteries of the battery bank, or a cell type of the battery bank.

3. The apparatus of claim 1, wherein the manufacturing line further includes one or more aging stations coupled to the formation station and configured to perform an aging process on the first plurality of batteries and the second plurality of batteries.

4. The apparatus of claim 1, further comprising a controller coupled to the charging circuit and to the battery bank, wherein the controller is configured to control transfer of the charge from the battery bank to the first plurality of batteries, return of the charge from the first plurality of batteries to the battery bank, transfer of the charge from the battery bank to the second plurality of batteries, and return of the charge from the second plurality of batteries to the battery bank.

5. The apparatus of claim 4, wherein the controller is further configured to receive an indication of one or more parameters associated with the first formation process.

6. The apparatus of claim 5, wherein the one or more parameters include one or more of a voltage level or a current magnitude associated with transfer of the charge.

7. The apparatus of claim 4, wherein the controller includes a command interface configured to receive a first command, and wherein the controller is further configured to initiate transfer of the charge from the battery bank to the first plurality of batteries in response to the first command.

8. The apparatus of claim 7, wherein the command interface is further configured to receive a second command, and wherein the controller is further configured to initiate return of the charge from the first plurality of batteries to the battery bank in response to the second command.

9. The apparatus of claim 1, wherein the battery bank includes a plurality of lithium-ion batteries (LiBs).

10. The apparatus of claim 1, wherein the battery bank includes a plurality of lead-acid batteries.

11. The apparatus of claim 1, wherein the battery bank includes a plurality of sodium-ion batteries (NIBs).

12. A method comprising:
during manufacture of a set of batteries that includes a first plurality of batteries, connecting a charging circuit to the first plurality of batteries upon placement of the first plurality of batteries at a formation station of a manufacturing line;
supplying charge from a battery bank to the first plurality of batteries during a first formation process of each battery of the first plurality of batteries;
receiving the charge at the battery bank from the first plurality of batteries during the first formation process;
connecting the charging circuit to a second plurality of batteries of the set of batteries upon placement of the second plurality of batteries at the formation station;
supplying the charge from the battery bank to the second plurality of batteries during a second formation process of each battery of the second plurality of batteries; and
receiving the charge at the battery bank from the second plurality of batteries during the second formation process,
wherein at least one attribute of the battery bank enables the battery bank to concurrently charge, for each plurality of batteries of the set of batteries, a particular number of batteries based on at least a threshold charging rate, and
wherein the at least one attribute of the battery bank further enables the battery bank to concurrently discharge, for each plurality of batteries of the set of batteries, the particular number of batteries based on at least a threshold discharging rate.

13. The method of claim 12, wherein the first formation process occurs after the placement of the first plurality of batteries at the formation station and during an aging process applied to the second plurality of batteries, wherein the aging process applied to the second plurality of batteries occurs prior to the placement of the second plurality of batteries at the formation station and prior to the second formation process, and wherein the second formation process occurs after the first formation process and after the aging process.

14. The method of claim 12, further comprising:
during the first formation process, forming one or more layers on first anodes of the first plurality of batteries by performing one or more of supplying the charge to the first plurality of batteries or receiving the charge from the first plurality of batteries; and
during the second formation process, forming the one or more layers on second anodes of the second plurality of batteries by performing one or more of supplying the charge to the second plurality of batteries or receiving the charge from the second plurality of batteries.

15. The method of claim 14, wherein the one or more layers include a solid electrolyte interphase (SEI) layer.

16. A system comprising:
a charging circuit configured to electrically connect to a first plurality of batteries upon placement of the first plurality of batteries at a formation station of a manufacturing line during manufacture of a set of batteries that includes the first plurality of batteries;
a battery bank coupled to the charging circuit, wherein the battery bank is configured to supply charge to the first plurality of batteries during a first formation process of each battery of the first plurality of batteries and to receive the charge from the first plurality of batteries during the first formation process,
wherein the charging circuit is further configured to electrically connect to a second plurality of batteries of the set of batteries upon placement of the second plurality of batteries at the formation station,
wherein the battery bank is further configured to supply the charge to the second plurality of batteries during a second formation process of each battery of the second plurality of batteries and to receive the charge from the second plurality of batteries during the second formation process,
wherein at least one attribute of the battery bank enables the battery bank to concurrently charge, for each plurality of batteries of the set of batteries, a particular number of batteries based on at least a threshold charging rate, and
wherein the at least one attribute of the battery bank further enables the battery bank to concurrently discharge, for each plurality of batteries of the set of batteries, the particular number of batteries based on at least a threshold discharging rate; and
a controller coupled to the charging circuit and to the battery bank, wherein the controller is configured to control transfer of the charge between the first plurality of batteries, the second plurality of batteries, and the battery bank.

17. The system of claim 16, wherein the controller is further configured to receive an indication of one or more parameters associated with the first formation process.

18. The system of claim 17, wherein the one or more parameters include one or more of a voltage level or a current magnitude associated with transfer of the charge.

19. The system of claim 16, wherein the controller includes a command interface configured to receive a first command, and wherein the controller is further configured to initiate transfer of the charge from the battery bank to the first plurality of batteries in response to the first command.

20. The system of claim 19, wherein the command interface is further configured to receive a second command, and wherein the controller is further configured to initiate return of the charge from the first plurality of batteries to the battery bank in response to the second command.

* * * * *